United States Patent [19]

Larson et al.

[11] Patent Number: 4,857,692
[45] Date of Patent: Aug. 15, 1989

[54] SPRAY MODE GAS METAL ARC WELDING PROCESS

[75] Inventors: Nils E. Larson, Ridgefield, Conn.; David B. Leturno, Country Club Hills, Ill.; Lawrence W. Cherne, Hubertus, Wis.

[73] Assignee: Union Carbide Corporation, Danbury, Conn.

[21] Appl. No.: 233,046

[22] Filed: Aug. 17, 1988

[51] Int. Cl.⁴ .............................................. B23K 9/00
[52] U.S. Cl. .................................. 219/74; 219/137 R
[58] Field of Search ................ 219/72, 74, 136, 137 R

[56] References Cited

U.S. PATENT DOCUMENTS

| 3,496,323 | 2/1970 | Lesnewich et al. | 219/74 |
|---|---|---|---|
| 4,463,243 | 7/1984 | Church | 219/74 |
| 4,529,863 | 7/1985 | Lebel | 219/137.42 |
| 4,626,646 | 12/1985 | Hilton | 219/74 |
| 4,645,903 | 2/1987 | DeVito | 219/137 R |
| 4,749,841 | 6/1988 | Galantino et al. | 219/74 |

FOREIGN PATENT DOCUMENTS 448106 4/1975 U.S.S.R. .................. 219/74

Primary Examiner—Clifford C. Shaw
Attorney, Agent, or Firm—Stanley Ktorides

[57] ABSTRACT

A spray mode gas metal arc welding process employing a shielding gas mixture consisting essentially of (A) 3 to 8 volume percent carbon dioxide, (B) 30 to 40 volume percent argon and (C) the balance helium.

8 Claims, 3 Drawing Sheets

SPRAY MODE GAS METAL ARC WELDING PROCESS

TECHNICAL FIELD

This invention relates generally to spray mode gas metal arc welding with a consumable wire electrode and more particularly to an improved process for gas metal arc welding which can extend the deposition range over which metal can be stably deposited in the axial spray mode.

BACKGROUND ART

Gas metal arc welding, commonly referred to as "GMAW" or "MIG" welding, is an arc welding process in which the arc is shielded from the ambient atmosphere by a gas. Metal is transferred to a workpiece through the arc from a consumable wire electrode. The consumable wire electrode is continuously fed into the arc at a preselected speed corresponding to a given deposition rate for a given wire size. The mode of metal transfer is dependent upon operating parameters such as welding current, voltage, wire size, wire speed, electrode extension and the protective gas shielding composition. The known modes of metal transfer include short circuit, globular transfer, axial spray transfer, pulse spray transfer and rotating arc axial spray transfer. Those skilled in the art are familiar with these terms and with their meanings. The short circuit, globular, and pulse spray modes of metal transfer are lower deposition rate processes in which metal is generally deposited at rates below about 10 pounds per hour (lbs/hr). The rotating arc axial spray mode of metal transfer is a very high deposition rate process which is unstable at metal deposition rates below about 17 lbs/hr using electrode wire size diameters of 0.035 inches or larger. Below this minimum rate of metal deposition the rotating arc becomes erratic and/or is unsustainable. The axial spray mode of metal transfer is used for depositing metal at rates above the low deposition rates provided by the short circuit, globular transfer or pulse spray modes of metal transfer and below the very high deposition rates obtained in the rotating arc axial spray mode.

A recent significant advance in the field of gas metal arc welding is the process described and claimed in U.S. Pat. No. 4,645,903—DeVito et al. which enables stable deposition in the axial spray mode of metal transfer up to a rate of 25 lbs/hr. using a wire diameter size within the range of from 0.035 to 0.052 inch. Prior to the advancement of this patent, the axial spray mode of metal transfer was limited to a metal deposition rate of from 5-12 lbs/hr. using the aforesaid wire sizes. Above the maximum deposition rate, the welding operation becomes erratic and less stable until a rotating arc is established by raising the wire feed rate to the minimum deposition rate required for a stable rotating arc.

The non-rotating arc axial spray mode of metal transfer is generally considered to be the preferred choice of metal transfer for all position GMAW welding where reliability, stability, high quality and at least a relatively high deposition rate is required. In the axial spray mode of metal transfer, fine droplets of molten metal are pinched off the end of the moving wire and fed axially through the arc column to the weld pool. The pinch effect is caused by electromagnetic forces on the molten tip of the wire. The rotating spray arc was developed to increase the operating deposition range for GMAW welding. In the rotating arc mode of metal transfer the arc is physically rotated by electromagnetic forces in a helical pattern about a longitudinal axis. As the arc rotates, a controlled stream of metal droplets is transferred from the electrode tip to the weld pool over a relatively wide area. The weld penetration provided by the non-rotating arc axial spray transfer mode is much deeper and is easier to control than that provided by the rotating arc mode.

It is thus desirable to have an improved spray mode gas metal arc welding process and it is particularly desirable to have an improved gas metal arc welding process which can extend the deposition range for metal deposition in the axial spray mode.

Accordingly it is an object of this invention to provide an improved spray mode gas metal arc welding process.

It is a further object of this invention to provide an improved gas metal arc welding process which can enable a significant increase in the rate at which metal may be stably deposited in the axial spray mode.

SUMMARY OF THE INVENTION

The above and other objects which will become apparent to those skilled in the art upon a reading of this disclosure are attained by the present invention which is:

A process for spray mode gas metal arc welding with a consumable wire electrode comprising:

(a) forming an arc between said consumable wire electrode and a workpiece;
(b) maintaining a substantially constant arc voltage between said wire electrode and the workpiece;
(c) feeding the consumable wire electrode through a welding torch contact tube into said arc;
(d) transferring metal from the electrode to the workpiece; and
(e) shielding the arc with a gas mixture consisting essentially of:
  (A) 3 to 8 volume percent carbon dioxide;
  (B) 30 to 40 volume percent argon;
  (C) balance helium.

DETAILED DESCRIPTION

The invention will be described in detail with reference to the Drawings.

Figure 1:
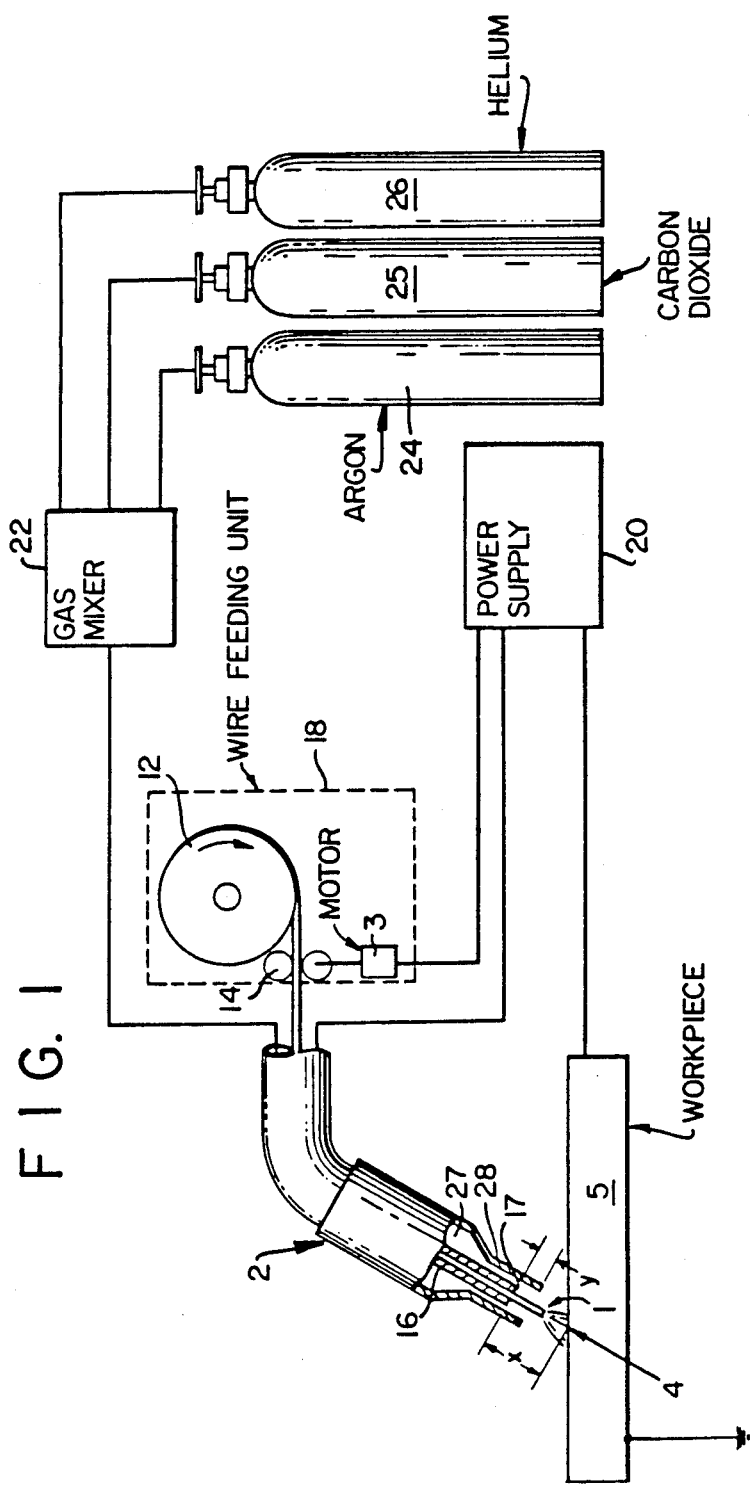
FIG. 1 is a schematic diagram of one system useful for carrying out the process of this invention.

Referring now to FIG. 1, consumable wire electrode 1 is drawn from reel 12 by feed roll 14 through contact tube 16 in gas shielded arc welding torch 2. The consumable wire electrode may have a diameter within the range of from 0.023 to 0.052 inch and may be composed of any suitable metal composition appropriate for the particular welding application. Examples of suitable metal compositions include any wires such as ER70S-3,-6-7 gas metal arc welding wires called out in American Welding Society Specification A5.18.

Any suitable gas shielded torch may be used to carry out the process of this invention. One such suitable torch is the ST-16 torch which is commercially available from L-Tec Corporation. The torch may be either manually operated for mechanized. In the embodiment illustrated in FIG. 1, torch 2 is a mechanized torch. Feed roll 14 is driven by drive motor 3 contained in wire feeding unit 18 which can feed wire at the speeds necessary to achieve the desired deposition rates. One commercially available feeding unit is the "High Deposition" feeder manufactured by L-Tec Corporation which can feed wire up to 2000 inches per minute (ipm).

To assist in handling the inertia of a rotating wire package, it is desirable to employ a coasting braking system with an adaptive burnback circuit to prevent the wire from sticking to the contact tube upon termination of the welding operation.

Power supply 20 supplies power to both wire feeding unit 18 and torch 2. Power supply 20 is voltage controlled and of the constant potential type.

In operation an arc 4 is established between consumable electrode 1 and workpiece 5 by energizing power supply 20 and feeding the electrode into direct contact with the workpiece. The arc voltage between the electrode and the workpiece is kept substantially constant during the welding process. By "substantially constant" it is meant that the arc voltage varies not more then 5 percent from the setpoint during the welding process. The arc voltage setpoint is at a point where a stable arc is achieved. For example, for 0.023 inch diameter wire a stable arc is achieved with an arc voltage of between 24 and 30 volts, and for 0.035 to 0.052 inch diameter wire a stable arc is achieved with an arc voltage between 35 and 51 volts. The consumable wire electrode is fed through welding torch contact tube 16 into the arc and metal is transferred from the electrode to the workpeice.

The electrode 1 is fed through the contact tube 16 into the arc 4 formed between the electrode 1 and workpiece 5. Contact tube 16 is connected through torch 2 to power supply 20 for supplying power to electrode 1. Workpiece 5 is connected to ground in common with the power supply ground. Preferably torch 2 is held above or at a distance from the workpiece 5 to assure an electrode extension or torch to work distance x. For a 0.023 inch diameter electrode the preferred electrode extension is within the range of from ⅜ to ¾ inch, most preferably about ⅝ inch, and for a 0.035 to 0.052 inch diameter electrode the preferred electrode extension is within the range of from ¾ to 1½ inches, most preferably about 1 inch.

The arc is shielded from the ambient atmosphere by a gas mixture consisting essentially of:
(A) 3 to 8 volume percent carbon dioxide;
(B) 30 to 40 volume percent argon;
(C) balance helium.

Referring back now to FIG. 1, the shielding gas mixture useful with this invention is made up within gas mixer 22 which receives the component gases from cylinders 24, 25, and 26. For example cylinder 24 may contain argon, cylinder 25 may contain carbon dioxide and cylinder 26 may contain helium. Any other suitable gas storage container, such as a storage tank, may also be employed in conjunction with the invention. Gas mixer 22 can be any conventional gas mixer which can be set to meter the appropriate gas from each gas source to establish the gas mixture useful with the present invention.

The shielding gas mixture useful with this invention is then passed through conduit means 6 to torch 2 and is passed through space 27 between contact tube 16 and torch cup 28 so that it forms a shroud for shielding arc 4 from the ambient atmosphere. Torch cup 28 preferably extends beyond the front end 17 of contact tube 16 so that the contact tube is recessed within the torch cup for a distance y. Preferably distance y is at least 5/32 inch.

Figure 2:
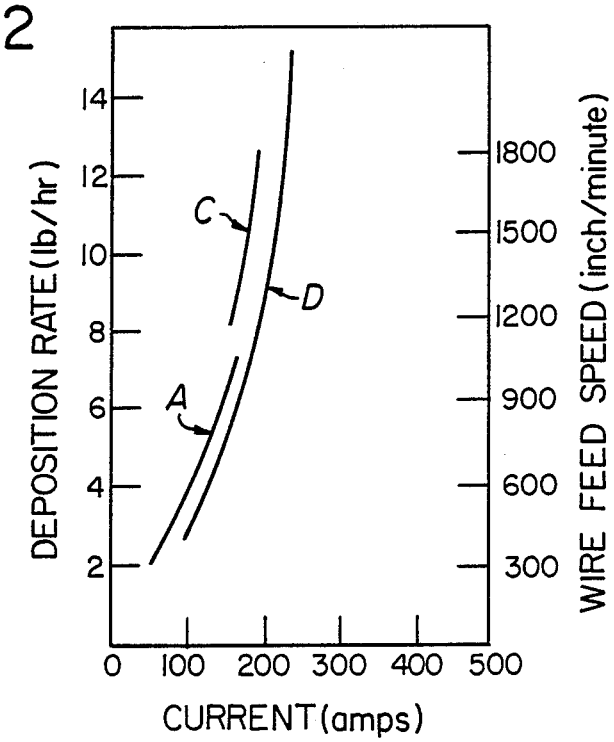
FIG. 2 is a graphical representation of the deposition rate performance of the process of this invention employing 0.023 inch diameter wire in the axial spray mode, and of the deposition rate performance of other known methods.
Figure 3:
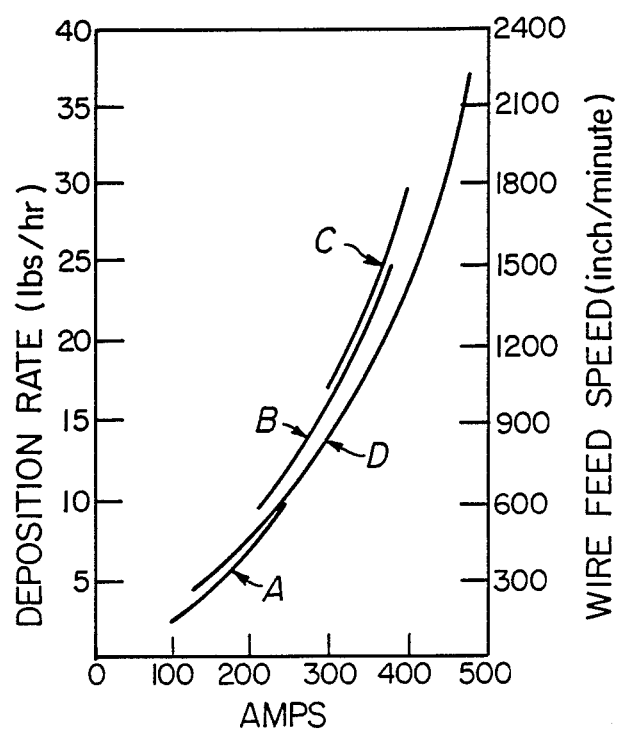
FIG. 3 is a graphical representation of the deposition rate performance of the process of this invention employing 0.035 inch diameter wire in the axial spray mode, and of the deposition rate performance of other known methods.
Figure 4:
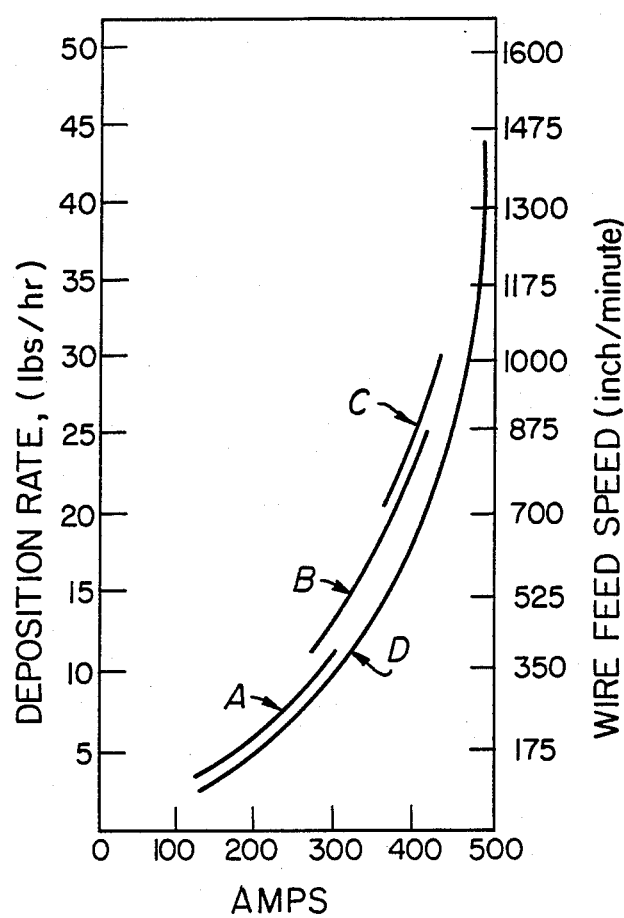
FIG. 4 is a graphical representation of the deposition rate performance of the process of this invention employing 0.045 inch diameter wire in the axial spray mode, and of the deposition rate performance of other known methods.

Heretofore the ability to achieve high deposition rates with stability required operation in the rotational spray arc mode. FIGS. 2, 3, and 4 are graphical representations of the stable deposition ranges for 0.023, 0.035, and 0.045 diameter wire respectively. In FIGS. 2, 3, and 4 Curve A represents the stability region for conventional gas metal arc welding, Curve C represents the stability region for gas metal arc welding in the rotational spray arc mode, and Curve D represents the stability region for the gas metal arc welding process of this invention in the axial spray arc mode. In FIGS. 3 and 4 additional curve B represents the stability region for the improved gas metal arc welding process disclosed and claimed in U.S. Pat. No. 4,645,903 in the axial spray arc mode. The shielding gas composition used to illustrate the invention and to generate the data reported in FIGS. 2–4 was comprised of 61 volume percent helium, 35 volume percent argon and 4 volume percent carbon dioxide. Measurements of deposition rate were taken over a wide range of wire feed speeds, for the diameters illustrated, over which stable axial spray was obtained.

As can be seen from the graphs of FIGS. 2, 3, and 4, the gas metal arc welding process of this invention enables, for a 0.023 diameter electrode, a stable deposition rate in the axial spray mode of up to about 15 lbs/hr, and for a 0.035 and 0.045 diameter electrode, significantly increased stable deposition rates in the axial spray mode, higher than the other gas metal arc welding methods, even in the rotational spray arc mode.

Now by the use of the process and gas mixture of the present invention, one can carry out spray mode gas metal arc welding in an improved manner. In particular one can carry out gas metal arc welding in the preferred axial spray arc mode at a higher stable deposition rate than has been heretofore possible with other known gas metal arc welding methods.

Although the gas metal arc welding process of this invention have been described in detail with reference to certain specific embodiments, those skilled in the art will recognize that there are other embodiments of the invention within the scope and spirit of the claims.

We claim:
1. A process for spray mode gas metal arc welding with a consumable wire electrode comprising:
(a) forming an arc between said consumable wire electrode and a workpiece;
(b) maintaining a substantially constant arc voltage between said wire electrode and the workpiece;
(c) feeding the consumable wire electrode through a welding torch contact tube into said arc;

(d) transferring metal from the electrode to the workpiece; and
(e) shielding the arc with a gas mixture consisting essentially of:
  (A) 3 to 8 volume percent carbon dioxide;
  (B) 30 to 40 volume percent argon;
  (C) balance helium.

2. The process of claim 1 wherein the electrode has a diameter within the range of from 0.023 to 0.052 inch.

3. The process of claim 2 wherein the wire electrode is fed at a rate so as to enable the transference of up to 55 pounds per hour of metal from the electrode to the workpiece.

4. The process of claim 1 wherein the arc voltage is within the range of from 24 to 51 volts.

5. The process of claim 1 wherein the spray mode gas metal arc welding is carried out in the axial spray mode.

6. The process of claim 1 wherein the contact tube is maintained at a distance from the workpiece to enable an electrode extension of from 0.5 to 1.5 inches.

7. The process of claim 1 wherein the contact tube is recessed in the welding torch which has a torch cup extending beyond the front end of the contact tube.

8. The process of claim 7 wherein the said recess is at least 5/32 inch.

* * * * *